Aug. 24, 1943.        I. I. SHULTZ        2,327,746
PROCESS AND APPARATUS FOR CATALYTIC CONVERSION
Filed March 3, 1941        2 Sheets-Sheet 1
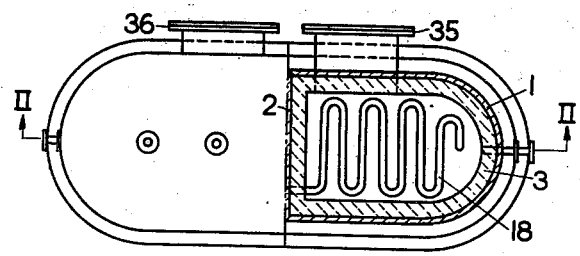
Fig. I
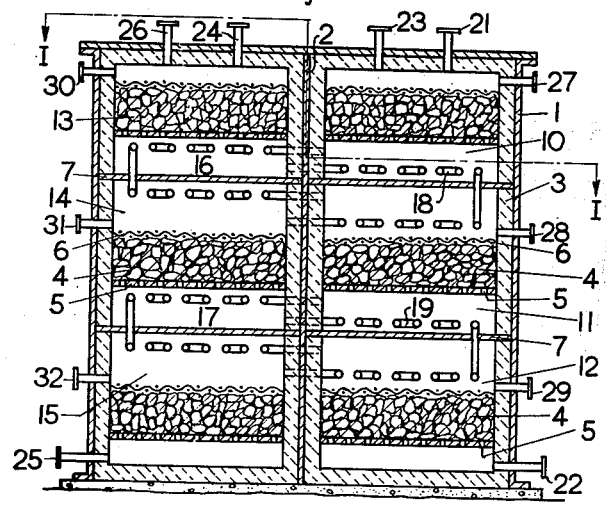
Fig. II
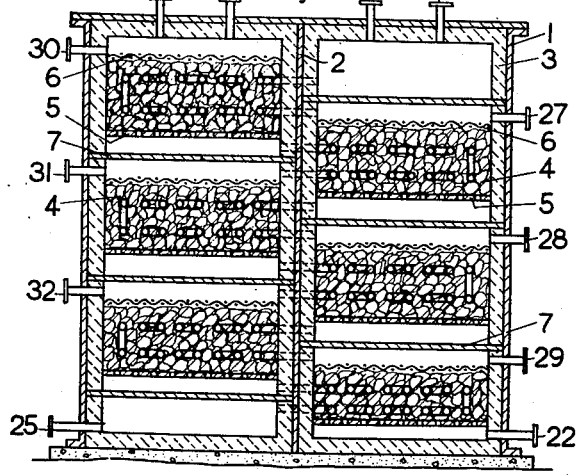
Fig. III
Inventor: Irving I. Shultz
By his Attorney:

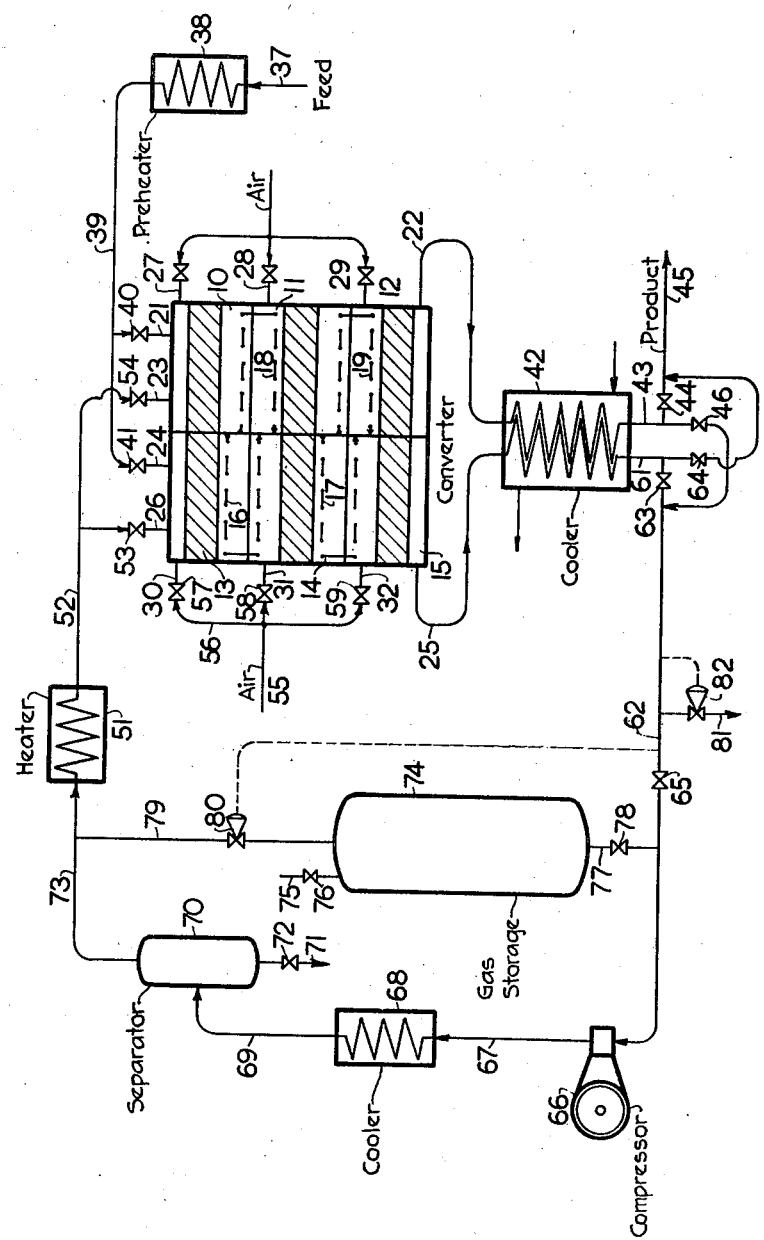

Patented Aug. 24, 1943

2,327,746

UNITED STATES PATENT OFFICE 2,327,746

PROCESS AND APPARATUS FOR CATALYTIC CONVERSION

Irving I. Shultz, Los Angeles, Calif., assignor to Shell Development Company, San Francisco, Calif., a corporation of Delaware Application March 3, 1941, Serial No. 381,486

8 Claims. (Cl. 196—52)

The present invention relates to a process and apparatus for executing catalytic conversions, particularly endothermic conversions, with the aid of regenerative contact masses, periodically restoring the efficiency of the contact mass in situ by passing a regenerating fluid therethrough and economically utilizing the heat of regeneration in the process.

At the present time the efforts of the oil industry are directed mainly towards the production of even better yields of further improved petroleum products by making use of various catalytic processes. These various catalytic processes fall under three main categories, namely, synthesis, rearrangement and cracking. In the case of synthesis, the aim is to synthesize various desired hydrocarbons from low molecular weight materials, such as the lower olefines, the constituents of cracked and natural gas, etc. The various syntheses, such for instance as polymerization, alkylation, etc., nearly all involve exothermic reactions and can be conveniently carried out in many cases at low and moderate temperatures. Although much progress has been made with catalytic syntheses and processes for the production of superior products from cracked gases, etc., are now used to a considerable extent, the catalytic treatment of hydrocarbons to produce various rearrangement and cracking reactions has not been so successful. The aim in these processes is to carry out certain useful individual rearrangement and/or cracking reactions, most of which occur to a certain extent in thermal treatments, under closely controlled conditions. These reactions, since they are generally endothermic and usually require relatively high temperatures, are much more difficult to carry out on a commercial scale. There are, at the present time, two main methods for carrying out these various endothermic processes. Although a certain measure of success has been achieved by both methods in isolated cases, both methods possess certain inherent disadvantages which make their application costly.

According to the first of these methods the hydrocarbon or other combustible fluid to be treated is passed, usually in the vapor phase, through a suitable contact mass packed in heated tubular reactors. Since, in this method, the heat required must be introduced into the reaction zone through the reactor walls, metallic tubes of small diameter (usually less than 3½ in.) and considerable length must be employed. This requires the use of a great number of tubes; for instance, a plant capable of handling 1000 bbls. of feed per day usually requires over 250 tubes each 14 feet long. Furthermore, these tubular reactors are quite expensive and must be frequently replaced since the only commercial materials so far found which possess the necessary mechanical strength and heat conductivity and which are capable of withstanding the repeated change from reducing conditions (conversion period) to oxidizing conditions (regeneration period) are a few expensive alloy steels, and even these have only a very short life. The use of such tubular reactors also carries other very important disadvantages. The time required for the periodic reactivation or regeneration of the contact mass is approximately proportional to the length of the contact bed and is quite long when using such tubes.

The other alternative method for executing such reactions is to pass the material to be treated, usually in the vapor phase, in contact with a contact mass contained in a converter of relatively large dimensions. In this method the necessary heat is either supplied by heating tubes embedded in the catalyst mass or by periodically heating the contact mass. This method, as practiced heretofore, while it has certain advantages over the above-described method using tubes packed with contact material, has inherent disadvantages which militate against its use. Application of all or a part of the necessary heat by circulating molten eutectic salt mixtures through suitable heating tubes embedded in the contact mass is very expensive and troublesome and presents very great engineering difficulties. If the heat is to be supplied by periodically heating the contact mass, the process cannot be executed under closely controlled conditions at the most desirable temperature but is executed at a varying temperature as the contact mass cools. This method also necessitates the use of very short conversion periods; it also entails considerable loss of time and the converter must be subjected to high vacuum after each conversion period in order to avoid excessive loss of material. Also, the regeneration takes place over a temperature range and consumes more time when this method is applied.

In my copending application, Serial No. 316,148, filed January 29, 1940, of which the present application is a continuation-in-part, I have described a new and improved method and apparatus for executing catalytic conversions of the type in question, wherein most of the disadvantages inherent in the hitherto proposed methods are substantially avoided. In one modification of this method the contact mass is divided into a plurality of separate beds positioned one above the other within two contiguous reaction zones provided in a single converter closely associated with a variable temperature furnace. The separate beds of contact material in each reaction zone are separated from one another by horizontal partitions which are by-passed by tubular coils positioned in the variable temperature furnace. Material is subjected to a treatment involving a substantially endothermic reaction in one of the reaction zones, the endothermic heat of reaction being supplied to the reactants by passing them through the coils positioned in the variable temperature furnace. An exothermic reaction, for example, the regeneration or reactivation in situ of the contact material, is effected simultaneously in the contiguous reaction zone, the excess exothermic heat being removed from the reactants by passing them through the coils positioned in the variable temperature furnace. In accordance with the improved process of my present invention, the contact mass is divided into a plurality of separate portions or beds positioned one above the other within two contiguous reaction zones provided in a single converter. Horizontal partitions within each reaction zone separate the portions of contact material from one another. The partitions are by-passed by tubular coils positioned within the contiguous reaction zone, thus permitting the reactants to be passed from each reaction zone into the respective contiguous reaction zone in indirect heat exchange relation at a plurality of points along the length of the reaction zones.

The material to be treated is preheated outside of the converter to a temperature sufficiently high to initiate the endothermic reaction in the presence of the contact material and led preferably in the vapor phase, consecutively through, and in direct contact with the contact material positioned within one of the contiguous reaction zones. After passage through each separate portion of the contact mass in the endothermic reaction zone the material being treated is subjected to indirect heat exchange with regenerating fluid and/or catalyst by passage through one of the coils suitably positioned within the contiguous reaction zone undergoing regeneration. In the regeneration or reactivation of the contact mass, an inert gas, such, for example, as combustion gas or flue gas, is passed through the reaction zone undergoing regeneration, and an oxidizing fluid, such as an oxygen-containing gas, is added to this inert gas before contacting each individual portion of contact material to be regenerated. After passage through each portion of contact material the regenerating fluid is subjected to indirect heat exchange with material undergoing endothermic reaction in one of the coils, suitably positioned within the contiguous reaction zone. There is thus effected a continuous and uniform transfer of heat from a plurality of points within the reaction zone undergoing regeneration to a plurality of points of the endothermic reaction zone, and all of such heat transfer is effected within a reactor consisting of a unitary structure of maximum compactness.

The process and apparatus of the invention are described in more detail with reference to the attached drawings forming part of this specification and wherein Figure I represents a plan view partly in section and Figure II represents an elevational section of a novel converter particularly adapted to the execution of the process of the invention. Figure III represents a vertical section of a modified form of the novel converter, and Figure IV is a more or less diagrammatical view of a suitable arrangement of apparatus comprising the novel converter of the types illustrated in Figures I, II and III for carrying out the process of the invention. In the drawings parts of apparatus which are the same are designated by like reference characters.

Referring to Figures I and II, the converter comprises a metal shell 1 and internal partition 2 dividing the converter into two separate and contiguous reaction zones. The interior of the converter, including partition 2, is preferably lined with a suitable refractory lining 3, consisting of a material which does not promote carbon formation, for example, of gunnite, ceramic material, silicon, or the like. The catalyst bed is divided into a plurality of separate portions, 4, positioned one above the other in each of the two vertical reaction zones. Each portion or bed of the catalyst is supported on a suitable perforated support 5. In order to avoid motion and uneven distribution of the catalyst the respective catalyst layers may, if desired, be covered by suitable screens 6. The beds of contact mass are separated from one another by horizontal partitions 7 dividing the two vertical reaction zones into compartments 10, 11, 12 and 13, 14, 15, respectively. Each compartment is in communication with the compartment immediately above or below it in the same reaction zone, by means of a pipe coil positioned in the contiguous reaction zone. Thus compartments 10 and 11 are in communication with one another by means of pipe coil 16; and compartments 11 and 12 by means of pipe coil 17. Similarly, compartments 13 and 14 are in communication with one another by means of pipe coil 18; and compartments 14 and 15 by means of coil 19. Although pipe coils 16, 17, 18, 19 are shown in the drawings as consisting of two banks of tubes, each bank of which is positioned in an adjoining compartment, it is to be understood that the invention is not limited to the particular number of tubes shown and that each coil may consist of a greater number of banks of tubes suitably positioned in any desirable manner within adjoining compartments.

The converter is provided with feed inlet 21, outlet 22 and regenerating fluid inlet 23 for one of the vertical reaction zones; and feed inlet 24, outlet 25 and regenerating fluid inlet 26 for the contiguous vertical reaction zone. The converter is also provided with inlets 27, 28, 29, 30, 31 and 32 for the introduction of an oxidizing fluid into each of the separate compartments at a point near the upper part of each bed of contact mass. The converter is provided with a plurality of manholes of which two, 35 and 36, are shown in the drawings and which give access to each compartment of the converter to permit removal and introduction of the contact mass.

A modified form of the novel type of converter of the invention is shown in Figure III. The converter shown in Figure III differs from that shown in Figures I and II in that the pipe coils forming communication between superposed compartments of a single reaction zone are positioned within the catalyst beds of the contiguous reaction zone, thus providing even greater compactness of construction. In this type of converter the pipe coils embedded in the contact materials are preferably made of a suitable metal or alloy material which will not have any undesirable effects upon the contact mass and which will not be affected by the contact mass at the operating conditions.

The application of the novel reactors of the types illustrated in Figures I, II and III is shown by the flow diagram in Figure IV. For the purpose of illustrations it is assumed that the reaction zone consisting of compartments 10, 11 and 12 is on conversion, and that the contact material in the contiguous reaction zone consisting of compartments 13, 14 and 15 is being regenerated. The material to be treated, drawn from a suitable source, is forced by means not shown in the drawings through line 37 into preheater 38. Within preheater 38 the charge is heated to a temperature sufficiently high to initiate the desired conversion in the presence of the contact mass. From preheater 38 the charge is passed through line 39, valve 40 being open and valve 41 closed, through inlet 21, into compartment 10 of the reactor. Within compartment 10 the charge passes through a bed of contact material whereby partial conversion to desired reaction products is brought about with a drop in temperature of the reactants. Before leaving compartment 10 the material comprising conversion products is subjected to indirect heat exchange with hot regenerating fluid flowing through coil 18, thereby raising the temperature of the material being treated. From compartment 10 the material comprising reaction products is passed through coil 16 into the upper part of compartment 11. In passing through coil 16 the material undergoing treatment is subjected to additional indirect heat exchange with hot regenerating fluid in compartments 13 and 14, thereby further raising the temperature of the material undergoing treatment while simultaneously reducing the temperature of the regenerating fluid, emanating from the catalyst bed in compartment 13. The material undergoing conversion continues through the converter by passing through the bed of contact mass in compartment 11 wherein further conversion is effected, through coil 17 wherein heat is absorbed from regenerating fluid, and through the contact mass in compartment 12 wherein the conversion operation is completed. The reaction products leave converter through outlet 22 passing to a conventional cooler 42 wherein the reaction products are cooled. From cooler 42 the reaction products are passed through line 43, valve 44 being open and valve 46 closed, into line 45. Reaction products leaving the system through line 45 may be subjected to any further treatment to separately recover any desired part of the reaction products.

While the conversion phase of the operation is being carried out in the reaction zone consisting of compartments 10, 11 and 12, an inert gas, for example combustion or flue gas, drawn from a suitable source is preheated in heater 51 and passed therefrom through line 52, valve 53 being open and valve 54 closed, through inlet 26 into compartment 13. An oxidizing medium, for example an oxygen-containing gas such as air, is drawn from a suitable source and forced through line 55, manifold 56, valves 57, 58, 59, inlets 30, 31 and 32 into compartments 13, 14, and 15 at points near the tops of the beds of contact mass therein. In passing through the contact mass the inert gas and air effect the removal of reaction products comprising, for example, carbonaceous materials deposited upon the contact mass during a previous conversion operation, and restore the contact mass to the desired degree of catalytic activity. At least a substantial part of the deposited material will be removed by oxidation entailing a substantial liberation of heat. The temperature to which the inert gas is heated in heater 51 and the amount of air admitted to the reactor through inlets 30, 31 and 32 are controlled to effect the regeneration of the contact mass at a substantially uniform and constant rate.

After passing through the bed of contact material in compartment 13 the regenerating fluid is subjected to indirect heat exchange with material being converted flowing through coil 16, thereby removing some excess heat from the regenerating fluid. From compartment 13 the regenerating fluid is passed through pipe coil 18, wherein it is further cooled by indirect heat exchange with material undergoing conversion in compartments 10 and 11, into compartment 14 at a point above the bed of contact material therein. The regenerating fluid, now freed of excessive heat, is admixed with additional air emanating through inlet 31 and is passed through the bed of contact mass in compartment 14 to effect its regeneration. The regenerating fluid and products of regeneration continue through coil 19, contact mass in comparment 15, and are eliminated from the converter through outlet 25 leading to a cooler 42. From cooler 42 the cooled regenerating fluid and products of regeneration, substantially free of free oxygen, are passed through line 61, valve 63 being open and valve 64 closed, into line 62. A part or all of the regenerating fluid passing through line 62 may be recycled to the reaction zone of the converter undergoing conversion. To this end it is forced by means of compressor 66 through line 67, and cooler 68 into separator 70. Within separator 70 any liquid comprising water, which has been condensed in cooler 68, is separated and eliminated from the system through line 71 controlled by valve 72. From separator 70 the gas continues through line 73 into heater 51 and from thence to the converter as described above. A storage tank 74 of sufficient capacity to flush the reaction zones is preferably provided. A line 75 controlled by valve 76 positioned in storage tank 74 permits introduction of gas from an outside source or elimination of gas therefrom.

The system for storage and recirculation of regenerating fluid provides great variety and facility of operation. Thus, reaction products may be flushed from the reactor at the termination of an operation by suitable manipulation of valves to permit the flow of gas from tank 74 through lines 79, 73, 52 to the converter, and the gas containing the reaction products flushed from the reactor may be eliminated from the system through line 81. During the recycling of regenerating fluid by means of compressor 66 a constant gas pressure may be maintained within tank 74 by the passage of gas from line 73 through line 79 controlled by control valve 80. Excessive regenerating fluid is removed from the system through line 81 controlled by control valve 82. By means of line 77, controlled by valve 78, gas may be passed, when desired, from tank 74 into line 62 to flush the entire system, valve 65 being closed and valve 82 being open.

When the regeneration of the contact mass in the reaction zone comprising compartments 13, 14 and 15 has been completed the flow of iner' gas and air therethrough is stopped. The reactants are now passed therethrough to continue the endothermic conversion therein, and regeneration of the contact mass in the reaction zone comprising compartments 10, 11 and 12 is begun. Alteration of the respective flows from one zone to the other is effected by judicious manipulation of the valve shown, for example, the closing of valves 40, 44, 53, 57, 58, 59 and 63, and the opening of valves 24, 27, 28, 29, 46, 54 and 64.

Although the invention has been described with reference to a converter, each contiguous reaction zone of which is divided into three compartments containing a single bed of catalyst, it is to be understood that the invention is in no wise limited to this number of compartments and catalyst beds. If desired, each of the two contiguous reaction zones may be divided into a greater or lesser number of compartments, each containing one or more beds of catalytic material. The flow through the converter may be upwards or downwards and, if desired, upward flow may be used in one reaction zone of the converter and downward flow through the contiguous reaction zone of the same converter.

The advantages which may be realized through the use of the apparatus and method of my invention are several and important. According to the present method of operation, beds of contact mass of relatively large cross-section allowing large throughput capacities may be easily employed. Thus, for example, whereas a plant capable of treating 1000 bbls. of feed per day requires, in general, about 270 three-inch tubes, each 14 feet long, this same throughput may be treated more efficiently according to the invention in one small converter, such as illustrated in Figure I, II and III, having a total on-stream depth of catalyst of only 4½ feet and occupying only about 21 square feet of floor space. Since no heat is applied to the reactants through the converter walls, the converter may be lined with a ceramic or other material which does not deteriorate readily, catalyze the formation of carbon, or poison the contact mass.

The method of heat exchange whereby products of the exothermic reaction are passed through a plurality of coils within the endothermic reaction zone with simultaneous passage of products from the endothermic reaction zone through a plurality of coils within the exothermic reaction zone provides a means of efficient and uniform heat exchange within the reactor without extreme temperature gradients. For example, regenerating fluid at high temperature leaving the catalyst bed in compartment 14 is not directly contacted with the products of endothermic reaction of lowest temperature within compartment 11, but is first contacted with coil 17 containing products of endothermic reaction which have already been subjected to indirect heat exchange with the section of coil 19 in compartment 11. This improved method of heat interchange within the reactor permits the maximum utilization of exothermic heat produced in the regeneration operation, reduces the cost and upkeep of the converter, and also minimizes difficulties commonly encountered comprising uneven or incomplete regeneration, the degradation of the catalyst particles, etc.

Another advantage afforded by the present process is the economy and efficiency with which the regeneration may be effected. Since the catalyst is employed in a plurality of layers, the time required for reactivation may be maintained much shorter than that possible when employing the conventional tubular-type reactors; in fact, the reactivation, under optimum conditions, is reduced by a factor which is approximately the reciprocal of the number of layers of catalyst reactivated. Furthermore, the cost of pumping the regenerating gas through the catalyst requires considerable energy and always represents a substantial proportion of the reactivation costs; according to the present process the cost of pumping the regenerating gas through the catalyst during reactivation is less than that when employing tubular-type reactors by approximately this same factor.

Maintenance of desired operating conditions within the converter is attained not only by controlling the heat input in heaters 38 and/or 51 but by the rate at which the oxygen-containing gas is introduced at the head of the individual catalyst beds of contact mass undergoing regeneration. Since the time required to complete a process cycle generally equals the time required to complete the regeneration operation, the average rate of carbon removal from the catalyst in the zone undergoing regeneration substantially equals the average rate of carbon deposition upon the catalyst in the zone undergoing conversion. The rates at which oxygen is introduced into the zone undergoing regeneration therefore control the time required to complete a process cycle. The novel apparatus of the invention, which permits oxygen to be introduced at judiciously controlled rates at the head of each section of contact mass, enables the regeneration of every section of contact mass in the zone undergoing regeneration during a uniform period of time, thereby providing for the continuous transfer of exothermic heat of regeneration, substantially throughout the entire period of time of a process cycle, from each section of contact mass undergoing regeneration into the contiguous reaction zone undergoing endothermic conversion. Further control of operating conditions within the converter may be obtained by varying the depth of the beds of contact material. Thus, for example, the depth of successive beds of contact mass may increase or decrease progressively throughout the length of the reaction zones. The process and apparatus of the invention thus provide greater flexibility in adjustment and control of the reaction conditions whereby the exothermic heat of reaction is made available and distributed throughout endothermic reaction zone in a manner best suited to the nature and behavior of the material being treated. These various advantages are of the utmost importance in the large-scale execution of endothermic reactions such as, for example, endothermic hydrocarbon conversions wherein the deposition of carbonaceous material is seldom effected at a uniform rate throughout the reaction zone and varies with the nature of the charge.

The invention has been described in detail in its application to the simultaneous execution, within a single novel converter, of an endothermic conversion and an exothermic catalyst regeneration operation. It is to be understood, however, that the nature of the exothermic reaction which may be carried out in accordance with the process of the invention is not limited to a regeneration of the contact mass, and that any suitable material may, if desired, be subjected to a treatment involving an exothermic reaction in one of the two contiguous reaction zones of the novel converter while another material is subjected to a treatment comprising an endothermic reaction in the other of the two contiguous reaction zones.

While the present process and apparatus may be advantageously employed in the execution of any endothermic conversion with the aid of any of the conventional regenerative contact masses commonly used therefore, they are, in view of their several inherent advantages, particularly advantageous for the execution of endothermic hydrocarbon conversions, such for example as dehydrogenation, reforming and cracking. In these various processes any of the conventional regenerative contact masses may be employed. For example, in hydrocarbon dehydrogenation and reforming processes a conventional dehydrogenation or reforming catalyst such as active alumina, certain treated bauxites, certain zoelitic masses, or supported catalytic metal oxides or sulfides such as those of Cr, Mo, W, etc., may be used. In catalytic cracking, on the other hand, any of the conventional partially hydrated silica-alumina and silica-zirconia catalysts which may be applied in the apparatus and method of the present invention are disclosed in detail in the scientific and patent literature relating to the various respective processes.

I have, in the foregoing, described my invention in its preferred embodiments and shown by illustration apparatus suitable for the execution thereof. I am aware, however, that the described process and apparatus are capable of numerous variations and modifications which will be apparent to those skilled in the art. I do not, therefore, desire my invention to be limited by the specific embodiments illustrated. On the other hand, it is my intention that all such variations and modifications as fall within the spirit of the invention be comprehended in the scope of the claims.

I claim as my invention:

1. In a hydrocarbon treatment or conversion in which a converter providing two contiguous reaction zones each containing a plurality of beds of contact mass is employed, the said contact mass in each reaction zone being alternately on-stream to effect the desired hydrocarbon conversion and in regeneration to effect the removal of deposits of contaminants by combustion, one of said reaction zones undergoing regeneration while the other is on-stream, said on-stream reaction being an endothermic reaction and said regeneration being an exothermic reaction carried out at a higher temperature than the on-stream reaction, the combination of steps comprising passing hydrocarbon vapors under reaction conditions through one of said reaction zones, cycling an inert regenerating gas at elevated temperature through the contiguous reaction zone in which the contact mass is contaminated with combustible deposits from a previous on-stream operation, introducing air into said regenerating gas just prior to its contact with each successive bed of contact mass to burn said deposits therefrom, withdrawing partially converted vapors from the on-stream reaction zone at points between successive beds of said contact mass, passing said partially converted hydrocarbons through indirect heat exchanging means positioned within the reaction zone undergoing regeneration thereby adding heat to said partially converted hydrocarbons by indirect heat exchange with hot regenerating fluid, returning the heated partially converted hydrocarbons to the on-stream reaction zone to contact the subsequent bed of contact mass, simultaneously withdrawing regenerating fluid comprising products of regeneration from the reaction zone undergoing regeneration after passage through each of said beds of contact mass therein, passing said regenerating fluid through indirect heat exchanging means positioned within the on-stream reaction zone to partially cool said regenerating fluid by indirect heat exchange with hydrocarbon vapors, and returning the partially cooled regenerating fluid to the reaction zone undergoing regeneration to contact the subsequent bed of contact mass.

2. In a hydrocarbon treatment or conversion in which a converter providing two contiguous reaction zones each containing a plurality of beds of contact mass is employed, the said contact mass in each reaction zone being alternately on-stream to effect the desired hydrocarbon conversion and in regeneration to effect the removal of deposits of contaminants by combustion, one of said reaction zones undergoing regeneration while the other is on-stream, said on-stream reaction being an endothermic reaction and said regeneration being an exothermic reaction carried out at a higher temperature than the on-stream reaction, the combination of steps comprising passing hydrocarbon vapors under reaction conditions through one of said reaction zones, passing an inert regenerating fluid at elevated temperature through the contiguous reaction zone in which the contact mass is contaminated with combustible deposits from a previous on-stream operation, introducing an oxygen-containing gas into said regenerating fluid just prior to its contact with each successive bed of contact mass to burn deposits therefrom, withdrawing partially converted vapors from the on-stream reaction zone at points between successive beds of said contact mass, passing said partially converted hydrocarbons through indirect heat exchanging means positioned within the reaction zone undergoing regeneration thereby adding heat to said partially converted hydrocarbons by indirect heat exchange with hot regenerating fluid, returning the heated partially converted hydrocarbons to the on-stream reaction zone to contact the subsequent bed of contact mass, simultaneously withdrawing regenerating fluid comprising products of regeneration from the reaction zone undergoing regeneration after passage through each of said beds of contact mass therein, passing said regenerating fluid through indirect heat exchanging means positioned within the on-stream reaction zone to partially cool said regenerating fluid by indirect heat exchange with hydrocarbon vapors, and returning the partially cooled regenerating fluid to the reaction zone undergoing regeneration to contact the subsequent bed of contact mass.

3. In a hydrocarbon treatment or conversion involving two bodies of regenerative contact material positioned within separate contiguous reaction zones provided in a single converter which are used to carry out simultaneous and alternate endothermic hydrocarbon conversions and the exothermic regeneration of the contact material, the combination of steps which comprises passing hydrocarbon vapors to be treated under reaction conditions serially through separate portions of the contact material in one of said reaction zones to effect the endothermic hydrocarbon conversion, simultaneously passing an inert regenerating fluid at elevated temperature serially through separate portions of the contact material in the contiguous reaction zone in which the contact mass is contaminated with combustible deposits from a previous on-stream operation, introducing air into said regenerating fluid just prior to its contact with each successive portion of contact material to burn said deposits therefrom, withdrawing the hydrocarbon vapors comprising conversion products from the on-stream reaction zone at points between successive portions of contact material, passing said hydrocarbon vapors so withdrawn through indirect heat exchanging means positioned within the reaction zone undergoing regeneration thereby adding heat to said hydrocarbon vapors by indirect heat exchange with hot regenerating fluid, returning the heated hydrocarbon vapors to the on-stream reaction zone at a point prior to the subsequent portion of contact material, simultaneously withdrawing regenerating fluid comprising products of regeneration from the reaction zone undergoing regeneration after passage through each of said portions of contact material, passing said regenerating fluid through indirect heat exchanging means positioned within the on-stream reaction zone to partially cool said regenerating fluid by indirect heat exchange with hydrocarbon vapors, and returning the partially cooled regenerating fluid to the reaction zone undergoing regeneration at a point prior to the subsequent bed of contact material.

4. In chemical processes involving at least two bodies of regenerative contact material positioned within separate contiguous reaction zones provided by a single converter which are used to carry out simultaneously and alternately an endothermic chemical reaction and the exothermic regeneration of the contact material, the combination of steps which comprises passing reactants under reaction conditions serially through separate portions of contact material within one of said reaction zones, passing an inert regenerating fluid at elevated temperature serially through separate portions of contact material in said contiguous reaction zone, introducing air into said regenerating fluid just prior to its contact with each successive portion of the contact mass to burn deposits of contaminants therefrom, withdrawing partially converted reactants from the on-stream reaction zone at points between successive portions of contact material, passing said partially converted reactants through indirect heat exchanging means positioned within the reaction zone undergoing regeneration thereby adding heat to said partially converted reactants by indirect heat exchange with hot regenerating fluid, returning the partially converted reactants to the on-stream reaction zone at a point ahead of the subsequent portion of contact material, simultaneously withdrawing regenerating fluid comprising products of regeneration from the reaction zone undergoing regeneration after passage through each of said portions of contact material therein, passing said regenerating fluid so withdrawn through indirect heat exchanging means positioned within the on-stream reaction zone to partially cool said regenerating fluid by indirect heat exchange with reactants comprising endothermic reaction products, and returning the partially cooled regenerating fluid to the reaction zone undergoing regeneration at a point prior to the subsequent portion of contact material.

5. In a process for the simultaneous and alternate execution of a catalytic endothermic reaction and a catalytic exothermic reaction in separate, contiguous reaction zones provided in a single converter, each of said contiguous reaction zones containing a plurality of separate beds of contact material positioned one above the other, the combination of steps which comprises passing reactants under endothermic reaction conditions serially through the separate beds of contact material in one of said reaction zones, passing a separate stream of reactants under exothermic reaction conditions serially through the separate beds of contact material in the contiguous reaction zone, withdrawing partially converted reactants from the endothermic reaction zone at points between said beds of contact material, passing said partially converted reactants through indirect heat exchanging means positioned within the exothermic reaction zone, thereby adding heat to said partially converted reactants by indirect heat exchange with hot exothermic reaction products, returning said partially converted reactants to the endothermic conversion zone at a point ahead of the subsequent bed of contact material, simultaneously withdrawing exothermic reaction products from the exothermic reaction zone after passage through each of said beds of contact material therein, passing said exothermic reaction products so withdrawn through indirect heat exchanging means positioned within the endothermic reaction zone to partially cool said exothermic reaction products by indirect heat exchange with reactants comprising endothermic reaction products, and returning the partially cooled exothermic reaction products to the exothermic reaction zone at a point prior to the subsequent bed of contact material.

6. In apparatus for executing simultaneously and alternately endothermic chemical conversions with the aid of regenerative contact masses and the exothermic regeneration of contact masses in situ, a converter providing two substantially vertical contiguous reaction chambers, said converter being provided with in interior surface of a material which does not promote carbon formation, a plurality of separate beds of regenerative contact masses positioned one above the other within said reaction chambers, horizontal partitions between said beds of contact masses dividing said reaction chambers horizontally into a plurality of separate compartments, pipe coils positioned in each of said reaction chambers providing communication between adjoining compartments in the contiguous reaction chamber, separate inlets for reactants and for regenerating fluid situated before the first bed of contact mass in each of said reaction chambers, an outlet for reaction products and regenerating fluid situated beyond the last bed of contact mass in each of said reaction chambers, separate inlets for oxidizing gas situated just before each bed of contact mass in each of said reaction chambers, and controls for operating said reaction chambers alternately on-stream and in regeneration.

7. In apparatus for executing simultaneously and alternately endothermic chemical conversions with the aid of regenerative contact masses and the exothermic regeneration of contact masses in situ, a converter providing two substantially vertical contiguous reaction chambers, a plurality of separate beds of regenerative contact masses positioned one above the other within said reaction chambers, horizontal partitions between said beds of contact masses dividing said reaction chambers horizontally into a plurality of separate compartments, pipe coils positioned in each of said reaction chambers providing communication between adjoining compartments in the contiguous reaction chamber, separate inlets for reactants and for regenerating fluid situated before the first bed of contact masses in each of said reaction chambers, an outlet for reaction products and regenerating fluid situated beyond the last bed of contact masses in each of said reaction chambers, separate inlets for oxidizing gas situated just before each bed of contact masses in each of said reaction chambers, and controls for operating said reaction chambers alternately on-stream and in regeneration.

8. In apparatus for executing simultaneously and alternately endothermic chemical conversions with the aid of regenerative contact masses and the exothermic regeneration of contact masses in situ, a converter providing two substantially vertical contiguous reaction chambers, a plurality of separate beds of regenerative contact masses positioned one above the other within said reaction chambers, horizontal partitions between said beds of contact masses dividing said reaction chambers horizontally into a plurality of separate compartments, pipe coils embedded in the beds of contact masses in each of said reaction chambers providing communication between adjoining compartments in the contiguous reaction chamber, separate inlets for reactants and for regenerating fluid situated before the first bed of contact masses in each of said reaction chambers, an outlet for reaction products and regenerating fluid situated beyond the last bed of contact masses in each of said reaction chambers, separate inlets for oxidizing gas situated just before each bed of contact masses in each of said reaction chambers, and controls for operating said reaction chambers alternately on-stream and in regeneration.

IRVING I. SHULTZ.